(12) United States Patent
Ismail

(10) Patent No.: US 8,694,730 B2
(45) Date of Patent: Apr. 8, 2014

(54) BINARY TREE BASED MULTILEVEL CACHE SYSTEM FOR MULTICORE PROCESSORS

(76) Inventor: Muhammad Ali Ismail, Karachi (PK)

( * ) Notice: Subject to any disclaimer, the term of this patent is extended or adjusted under 35 U.S.C. 154(b) by 380 days.

(21) Appl. No.: 13/040,306

(22) Filed: Mar. 4, 2011

(65) Prior Publication Data

US 2012/0226867 A1    Sep. 6, 2012

(51) Int. Cl.
*G06F 12/00* (2006.01)
*G06F 13/00* (2006.01)

(52) U.S. Cl.
USPC ........... 711/122; 711/100; 711/113; 711/118; 711/119; 711/130; 711/147; 711/148; 711/170; 711/172; 711/E12.023; 711/E12.024

(58) Field of Classification Search
USPC ......... 711/100, 113, 118, 119, 122, 130, 147, 711/148, 170, 172, E12.023, E12.024
See application file for complete search history.

*Primary Examiner* — Midys Rojas
(74) *Attorney, Agent, or Firm* — Sarfaraz K. Niazi

(57) ABSTRACT

A binary tree based multi-level cache system for multi-core processors and its two possible implementations LogN and LogN+1 models maintaining a true pyramid is described.

16 Claims, 5 Drawing Sheets

BINARY TREE BASED MULTILEVEL CACHE SYSTEM FOR MULTICORE PROCESSORS

BACKGROUND OF THE INVENTION

1. Field of Invention

This invention generally relates to a cache memory system for multi-core processors 2. Discussion of Related Art The current general purpose multi-core processors [26, 30, 35] use the present 3-level (L1, L2 and L3) cache scheme. In this cache model every core has its own private L1 cache. The L2 cache may be private, shared or split. In first case L2 is also kept private to a core. In second approach, which is more general, each core has its own private L1 cache and shares L2 through L1. And in third case L2 cache is usually shared by half of the cores. Remaining half of the cores have their own shared L2 cache and then all L2 caches are connected to L3.

To improve the multi-core system performance and to avoid memory bottlenecks, present solutions concentrate on increasing the bandwidth and/or on sharing some parts of their caches and maintaining others as private. The technology of smart cache and hyper transport technology is being used by processor vendors but these technologies have not been worked out for greater number of cores.

Besides this, an attempt was made using reconfigurable cache design. But a problem with this is the additional time required to reconfigure the cache for every new problem. Also the behaviour of this solution on multiple cores executing multiple programs is yet to be explored.

Another approach, which is also used, is multi-sliced bank cache. This approach has low latency and better-hit rate but doesn't specify its behaviour for larger number of cores.

Also crossbar network and other processor-memory interconnections are being used to adjust the increased number of cores with existing 3-level cache system but the problems associated with this approach is very high cost of multiple read/write cache memories and the number of interconnections do not increase linearly with the number of cores.

So far attempts are being made to find adjustments of the present 3-level cache system with multi-core processors. This invention presents a multi-level cache system for multi-core processors in which the true memory pyramid (Memory Hierarchy) is maintained, that is, with increase in base size (Number of Cores), its height is being adjusted accordingly (Memory Levels).

For a processor with 'N' cores, where $c_i$, ($1 \leq i \leq N$), be the $i^{th}$ core, the binary tree based multi-level cache system is like a binary tree of 'N' terminals. The levels of cache are treated as intermediate nodes of the tree.

Each core will have its own L1 private cache, Two L1 caches of neighboring cores are connected to a L2 cache. Similarly two adjacent L2 caches are connected to a L3 cache and so on. The root of the tree is either the last level of cache or the main memory. These two configurations lead to two possible models "LogN+1" and "LogN" respectively.

DETAILED DESCRIPTION OF THE INVENTION

For a processor with 'N' cores, where $c_i$, ($1 \leq i \leq N$), be the $i^{th}$ core, the binary tree based multi-level cache system is like a binary tree of 'N' terminals.

The levels of cache are treated as intermediate nodes of a binary tree and all of these are binary shared Each core will have its own L1 private cache, thus there are total 'N' caches at L1.

At L2, 'N' L1 caches are grouped such that two L1 caches of neighbouring cores are connected to a L2 cache. Therefore, at L2 'N/2' binary shared caches is required in total.

Similarly at L3, two adjacent L2 caches are connected to a L3 cache. The number of L3 caches is therefore 'N/4'.

And the same procedure continues for the higher level of cache. For every higher cache level the number of binary caches reduces to half as that of its lower level.

The root of the tree is either the last level of cache or the main memory. These two configurations lead to two possible models "LogN+1" and "LogN".

Figure 1:
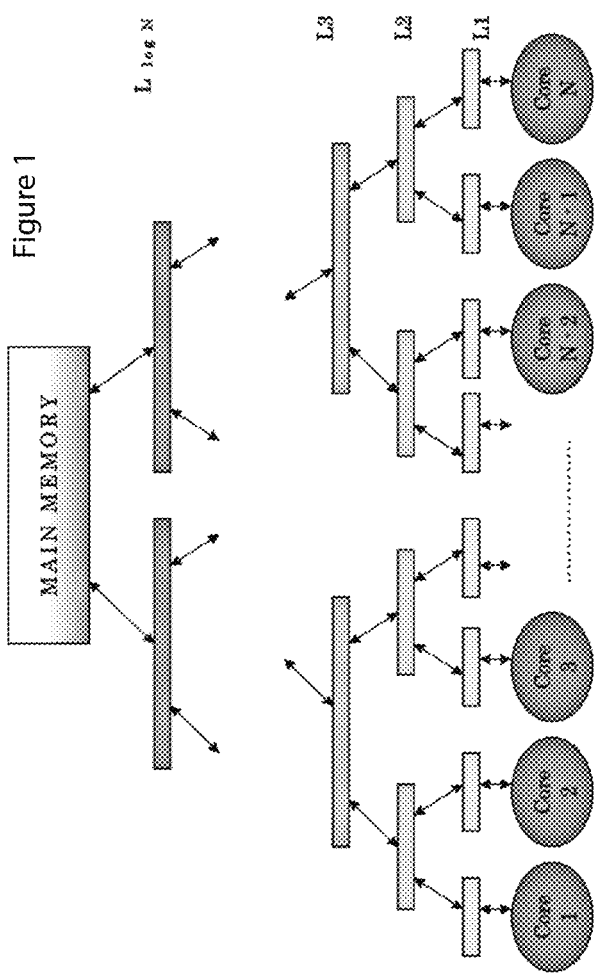
FIG. 1 shows the LogN+1 model for binary tree based multi-level cache system.

In LogN+1 model, the root of a system cache is a single final level of cache, connected to the main memory with a very high and fast bandwidth interface. In this model, the number of cache levels is ($Log_2 N+1$), as shown in FIG. 1.

FIG. 1

Figure 2:
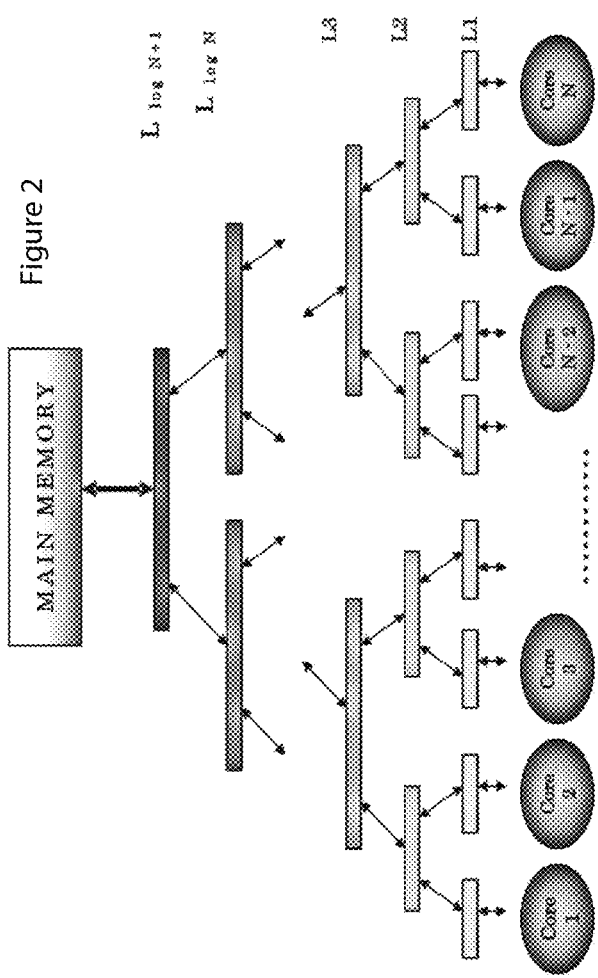
FIG. 2 shows the LogN model for binary tree based multi-level cache system.

In LogN model, $(Log_2 N+1)^{th}$ level of cache is removed. Thus the two caches at ($Log_2 N$) level are connected to a main memory through a high interface bus. In this model, the number of cache levels is reduced to ($Log_2 N$). In LogN Model the whole memory system consists of ($Log_2 N$) levels of cache plus one level of main memory, as shown in FIG. 2.

FIG. 2

In LogN+1 Models every cache from L2 to ($Log_2 N+1$) level has two descendants except L1 cache, which is private to a core and always available to that core. Whereas, for other levels the fair probability of a cache of serving its one of the descendent is ½.

Similarly, in LogN Models every cache from L2 to ($Log_2 N$) level has two descendants except L1 cache, which is private to a core and always available to that core. Whereas, for other levels the fair probability of a cache of serving its one of the descendent is ½.

To satisfy the properties of memory hierarchy, In case of LogN+1 model, ($Log_2 N$) and in case of LogN model, ($Log_2 N-1$) cache levels are inserted between CPU and main memory.

Size and access time of each cache at different level are calculated using geometric propagation such that for 'n' numbers sequence $\{a_0 r^k\}_{k=0}^{n-1}$ to the ratio between two successive terms is a constant 'r' and 'a' is first number of the sequence. Here 'n' is number of cache levels to be inserted between the main memory (a) and CPU. However some other suitable propagation like arithmetic and other mathematical relationship exploiting principle of locality can also be used.

Like any cache hierarchy, the binary tree based cache system may be analyzed using queuing theory by considering every cache as a server and data request either by a CPU or the lower level of cache as a client. A complete cache hierarchy may be considered as an open queuing network where multiple servers (caches) are attached in a specific pattern. A request from a client is served by a specific server (cache). If the server (cache) fulfils the request client leaves the queue otherwise the request is sent to next server (upper level cache). Probability of fulfilling or not of any request at any server (cache) is same as the hit or miss ratio. Using queuing network, performance parameters like marginal probabilities, utilization, throughput, mean number of jobs, mean queue length, mean response time and mean waiting time may be calculated for any individual server (cache) and for the complete network (cache hierarchy).

Figure 3:
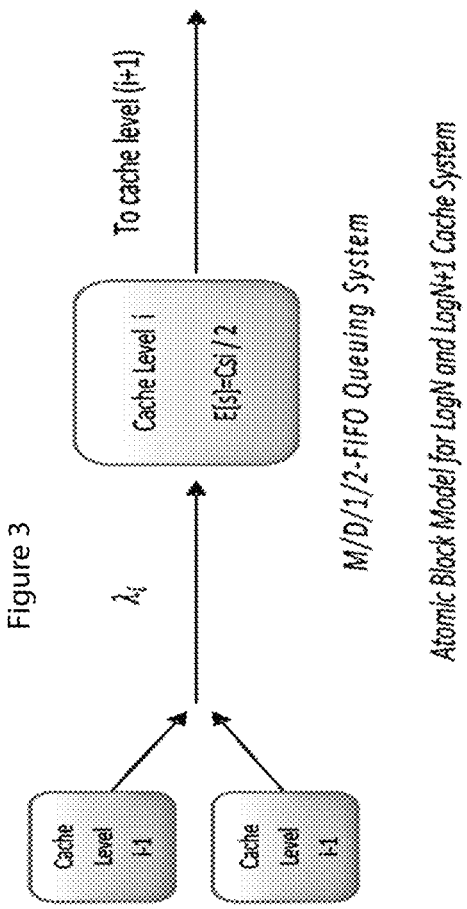
FIG. 3 shows an Atomic Block Model for LogN and LogN+1 Cache System

Considering the proposed binary multi-level cache system where every cache level except L1, which is local to the core, has two descendants. Average request rate, λ, for first level of cache is the same as that of requests made by the respective cores. Request rates for rest of levels are Poisson, as they depend on the probability of cache miss at their respective descendants. The service rate of each cache depends on its frequency and access time. So it is deterministic. Here in our approach every cache level except the first one has two descendants i.e.; clients, out of which only one can be served at a time on first come first serve basis with equal probabilities of being served. Therefore, M/D/1/2-FIFO queuing model may be applied for analyzing any cache level except the first one for its utilization, throughput, average number of jobs, average queue length, average response time and average waiting time. This basic atomic M/D/1/2-FIFO queuing model is presented in FIG. 3.

FIG. 3

Let $\lambda_i$ where $$i = 1, 2, 3, \ldots, \text{Log}N \text{ for Log}N \text{ Model}$$
$$i = 1, 2, 3, \ldots, \text{Log}N + 1 \text{ for Log}N + 1 \text{ Model}$$

be the arrival rate of requests at the ith level of cache, $\phi_{i,1}$ $$i = 1, 2, 3, \ldots, \text{Log}N \text{ for Log}N \text{ Model}$$
$$i = 1, 2, 3, \ldots, \text{Log}N + 1 \text{ for Log}N + 1 \text{ Model},$$

where be the probability of cache being hit and $\phi_{i,o}$ where $$i = 1, 2, 3, \ldots, \text{Log}N \text{ for Log}N \text{ Model}$$
$$i = 1, 2, 3, \ldots, \text{Log}N + 1 \text{ for Log}N + 1 \text{ Model}$$

such that $\phi_{i,o}=1-\phi_{i,1}$, be the probability of cache being missed at the $i^{th}$ level and search will proceed in the upper $(i+1)^{th}$ cache level.

Figure 4:
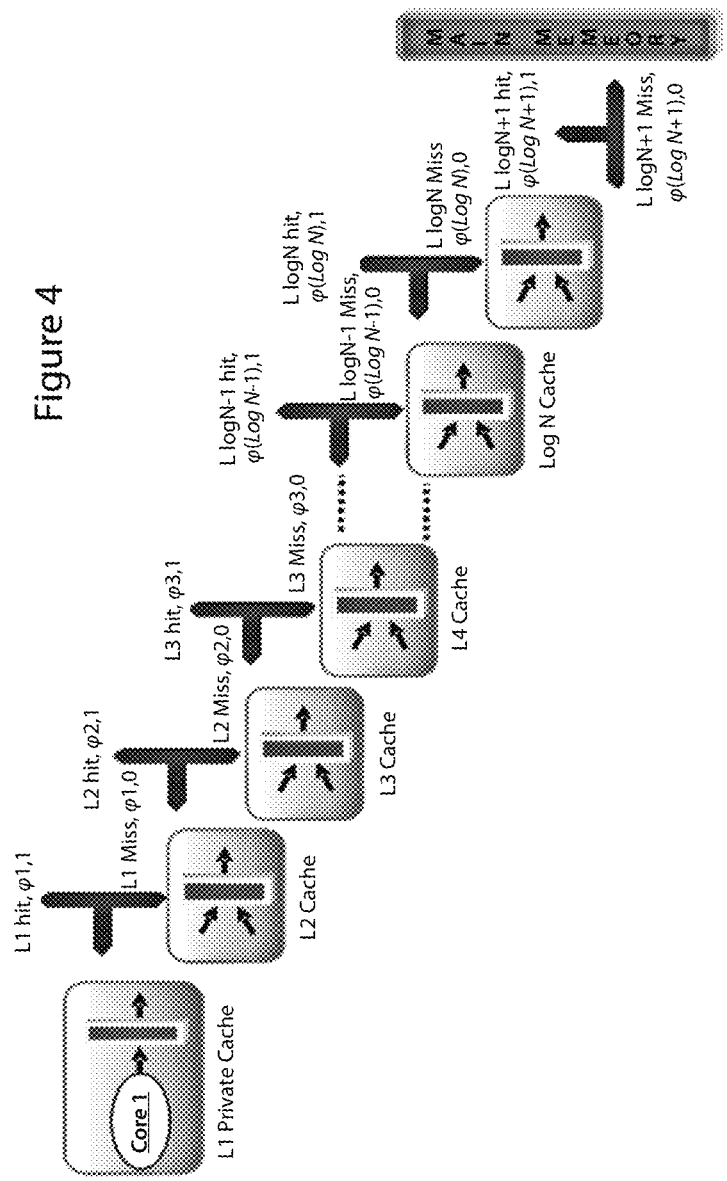
FIG. 4 shows an open Queuing Network Model for LogN+1 model

Atomic model for M/D/1/2—FIFO for LogN+1 cache system (FIG. 3) may be joined to form an open queue network of proposed binary based multi-level cache system. Every unit (cache) may be treated as a single object which leads to a queuing network from where network performance parameters for the whole cache system can be computed. Queuing networks for LogN+1 model is shown in FIG. 4. Here the number of queuing stage is same as that of the cache levels that is LogN+1.

Figure 5:
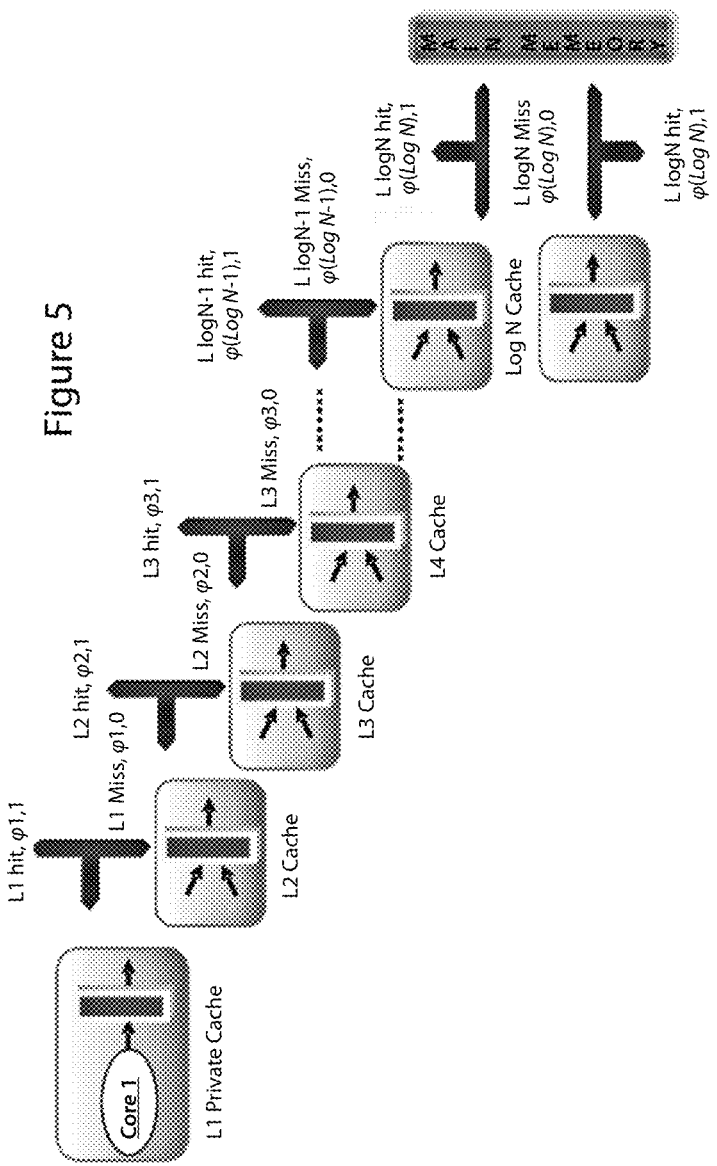
FIG. 5 shows an open Queuing Network Model for LogN model

Similarly, Atomic model for M/D/1/2—FIFO for LogN cache system (FIG. 3) may be joined to form an open queue network of proposed binary based multi-level cache system. Every unit (cache) may be treated as a single object, which leads to a queuing network from where network performance parameters for the whole cache system can be computed. Queuing networks for LogN model is shown in FIG. 5.

FIG. 5

Initially CPU generates a data request, which is searched in its private L1 cache. In case of miss hit that is the requested data is not found in the respective L1 cache, the search is extended to upper cache level associated with the L1 cache.

Thus In the invented cache system based on binary tree for multi-core processors all 'N' core can search their respective private L1 cache in parallel. 'N/2' cache searches can be done in parallel at cache level 2. Similarly 'N/4' searches at L3 cache and so on.

The foregoing description is intended to be illustrative and not limiting. Variation will occur to those skills in the art. Those variations are intended to be included in the invention, which is limited only by the spirit and scope of the claims.

What I claim is:

1. A multi-level cache system for multi-core processors consisting of LogN or LogN+1 cache level memories, wherein N is the number of core processors and LogN or LogN+1 is the number of cache levels.

2. The multi-level cache system of claim 1, wherein said cache system is a binary tree.

3. The multi-level cache system of claim 1, wherein said cache system is shared.

4. The multi-level cache system of claim 1, wherein the levels of said cache system are intermediate nodes of a binary tree.

5. The multi-level cache system of claim 1, wherein said each core has its own L1 private cache equal to number of cores 'N.'

6. The multi-level cache system of claim 5 wherein at L2 cache level, said 'N' L1 caches are grouped with neighbouring cores and connecting together.

7. The multi-level cache system of claim 6, wherein, at said L2 cache level, 'N/2' binary shared caches are present.

8. The multi-level cache system of claim 7, wherein at L3 cache level, two adjacent L2 caches are connected to said L3 cache.

9. The multi-level cache system of claim 8, wherein at said L3 cache level 'N/4' shared caches are present.

10. The multi-level cache system of any one of claim 1, 6 or 8, wherein said cache level at each higher-level result in reduction of the number of caches by one-half.

11. The multi-level cache system of claim 1, wherein the system comprises a binary tree having a root, wherein said root is either the last level of cache or the main memory.

12. The multi-level cache system of claim 11, wherein the root of said cache system is a single final level of cache, for said LogN+1 model, connected to the main memory.

13. The multi-level cache system of claim 12, wherein said cache levels have a number of levels calculated by the formula $\text{Log}_2 N+1$.

14. The multi-level cache system of claim 11, wherein for LogN model, the two caches at $\text{Log}_2 N$ level are connected to the main memory.

15. The multi-level cache system of claim 14, wherein said number of cache levels is reduced to $\text{Log}_2 N$.

16. The multi-level cache system of claim 14, wherein a memory system consists of $\text{Log}_2 N$ levels of cache plus one level of main memory.

* * * * *